Fig. 3

INVENTORS
WILLIAM A. FLETCHER
MAX E. TODD
BY
THEIR ATTORNEY

Oct. 3, 1961   W. A. FLETCHER ET AL   3,002,259
METHOD OF MAKING AN ARMATURE

Filed Aug. 2, 1954   12 Sheets-Sheet 9

INVENTORS
WILLIAM A. FLETCHER
BY MAX E. TODD

THEIR ATTORNEY

Oct. 3, 1961 W. A. FLETCHER ET AL 3,002,259
METHOD OF MAKING AN ARMATURE
Filed Aug. 2, 1954 12 Sheets-Sheet 11

INVENTORS
WILLIAM A. FLETCHER
MAX E. TODD
By
THEIR ATTORNEY

United States Patent Office 3,002,259
Patented Oct. 3, 1961

3,002,259
METHOD OF MAKING AN ARMATURE
William A. Fletcher, Daleville, and Max E. Todd, Windfall, Ind., assignors to General Motors Corporation, Detroit, Mich., a corporation of Delaware
Filed Aug. 2, 1954, Ser. No. 447,266
11 Claims. (Cl. 29—155.5)

This invention relates to the manufacture of armatures for dynamoelectric machines and is particularly concerned with a method and apparatus for mechanically winding the same.

Attempts have been heretofore made to mechanically perform certain of the winding operations on unwound armature assemblies so as to reduce the cost of manufacture of dynamoelectric machines and to provide a more perfect balanced armature. Some of these attempts have included the preforming of coils in one machine, the inserting of these preformed coils in slots of the armature core by another machine and subsequently inserting the ends of the inserted coil wires in proper slots in the commutator by still another machine. Another attempt to mechanically wind armatures included the forming of coils of wire directly on the armature core by a machine and subsequently identifying each of the leads so that they might be subsequently placed in the proper commutator slots by another machine. A still further attempt to mechanically wind armatures includes the utilization of a commutator with hooks formed on the commutator bars. These hooks are used to hold the ends of completed coils of wire which were wound on the armature core as the armature was revolved past a stationary wire guide. The insulation of the ends of wire in contact with the hooks is then removed by some suitable operation such as brushing, prior to the soldering of the wires to the hooks.

It is apparent that none of these attempts has successfully provided a machine which will completely wind and stake the ends of the windings into commutator slots. Further, none of these provide a machine wherein the above is accomplished while the armature was held in longitudinally fixed position so that the ends of the coils could be staked in proper slots in the commutator by the machine during the winding operation so that the soldering operation can be performed without further operations.

It is an object, therefore, of the present invention to provide a method and apparatus for completely and automatically winding an armature assembly and staking the ends of the windings in the proper slots in the slotted commutator.

It is another object of the present invention to provide an apparatus and method for simultaneously winding two coils of insulated coated wire on opposite sides of an armature core and to stake the ends of these coils in the proper slots of a commutator, and by repeating the winding and staking operations in the same machine after the machine indexes itself to provide a completely wound armature assembly that is in substantially perfect dynamic balance.

It is a further object of the present invention to wind an armature with nylon coated wire in the machine that completely winds the armature and stakes the ends of the windings in proper commutator slots so as to eliminate the brushing of wires before the soldering of wire ends to the commutator.

It is another object of the present invention to wind an armature assembly in the machine that maintains the armature in a fixed longitudinal position while other portions of the machine rotate the armature during the winding operation so as to present the proper core slots and commutator slots to the winding and staking means that operate in a timed sequential relation with each other.

Another object of the present invention is to provide an automatic machine adapted to hold an armature assembly for receiving windings thereon and to rotate said assembly in timed relation to a movable winding arm which guides the nylon covered wire under proper tension when the coils are formed upon said assembly. An additional object of the present invention is to provide an indexing mechanism in association with armature assembly, winding arm and staking mechanisms whereby the machine will automatically wind a complete series of armature coils on said assembly and stake the ends of said coils in proper commutator slots without requiring the attention of the operator after the assembly has been positioned in the machine.

Further objects and advantages of the present invention will be apparent from the following description, reference being had to the accompanying drawings wherein a preferred embodiment of the present invention is clearly shown.

*Description of apparatus*

Figure 1:
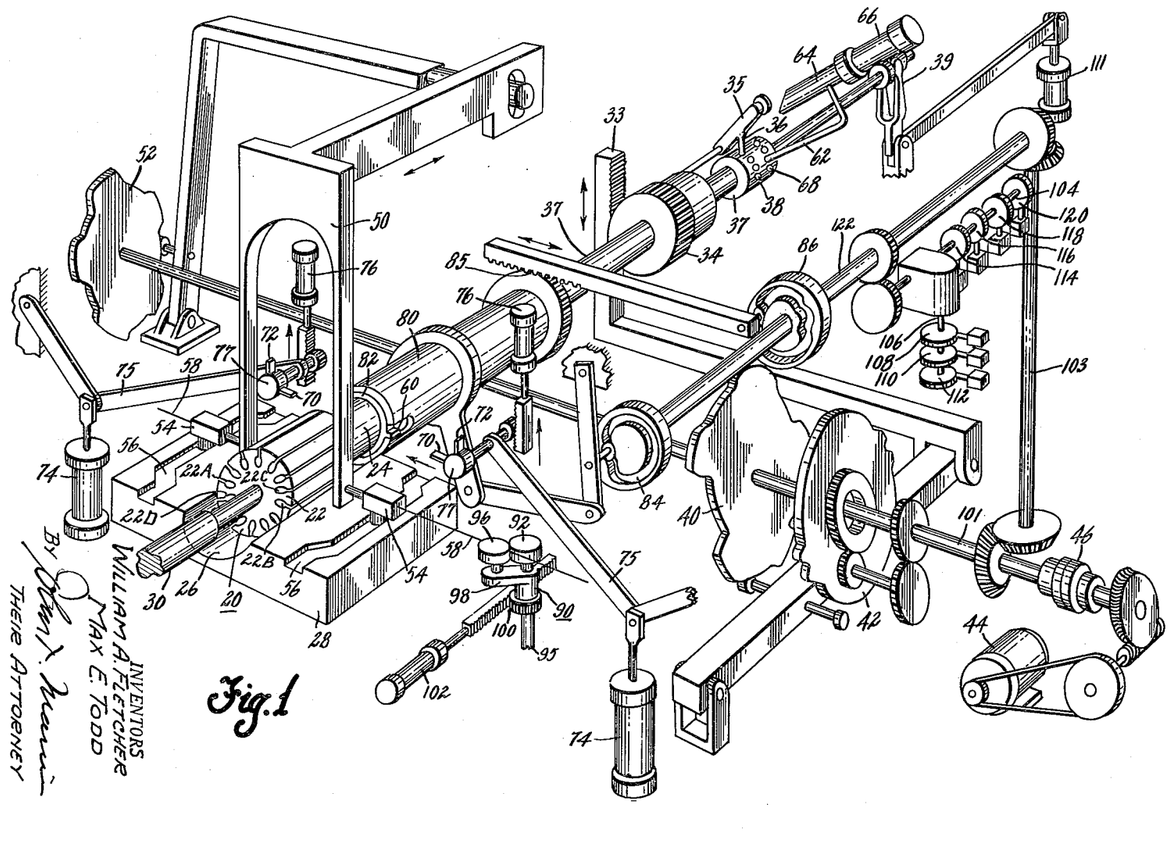
FIGURE 1, in perspective, diagrammatically shows various parts of the machine according to the present invention.

The armature winding machine shown diagrammatically in perspective in FIGURE 1 has the parts thereof arranged to completely wind the various coils of wire in proper slots in an armature core and insert and stake the end of the wound coils into proper slots in the commutator without human assistance other than that required to load and unload the machine.

To accomplish this result, an unwound armature assembly 20, comprising; a slotted armature core 22 and a commutator 24 is placed in groove 26 on armature nest block 28 so that a tail stock 30, partially shown in FIGURE 3, will axially move the end 31 of the armature shaft into position within a collet 32 and the end of the commutator 24 against the serrated portions of a member 37 which, when rotated, by means to be hereinafter described, will rotate the armature in an oscillatory movement so that the various steps of winding, inserting and staking may be performed at the proper time. The collet 32 is coaxially mounted and slidable within member 37 and extends to a shifter mechanism 39 which is suitably connected with a fluid cylinder 111 which when actuated will cause collet 32 to release its grip on the armature 20.

Figure 5:
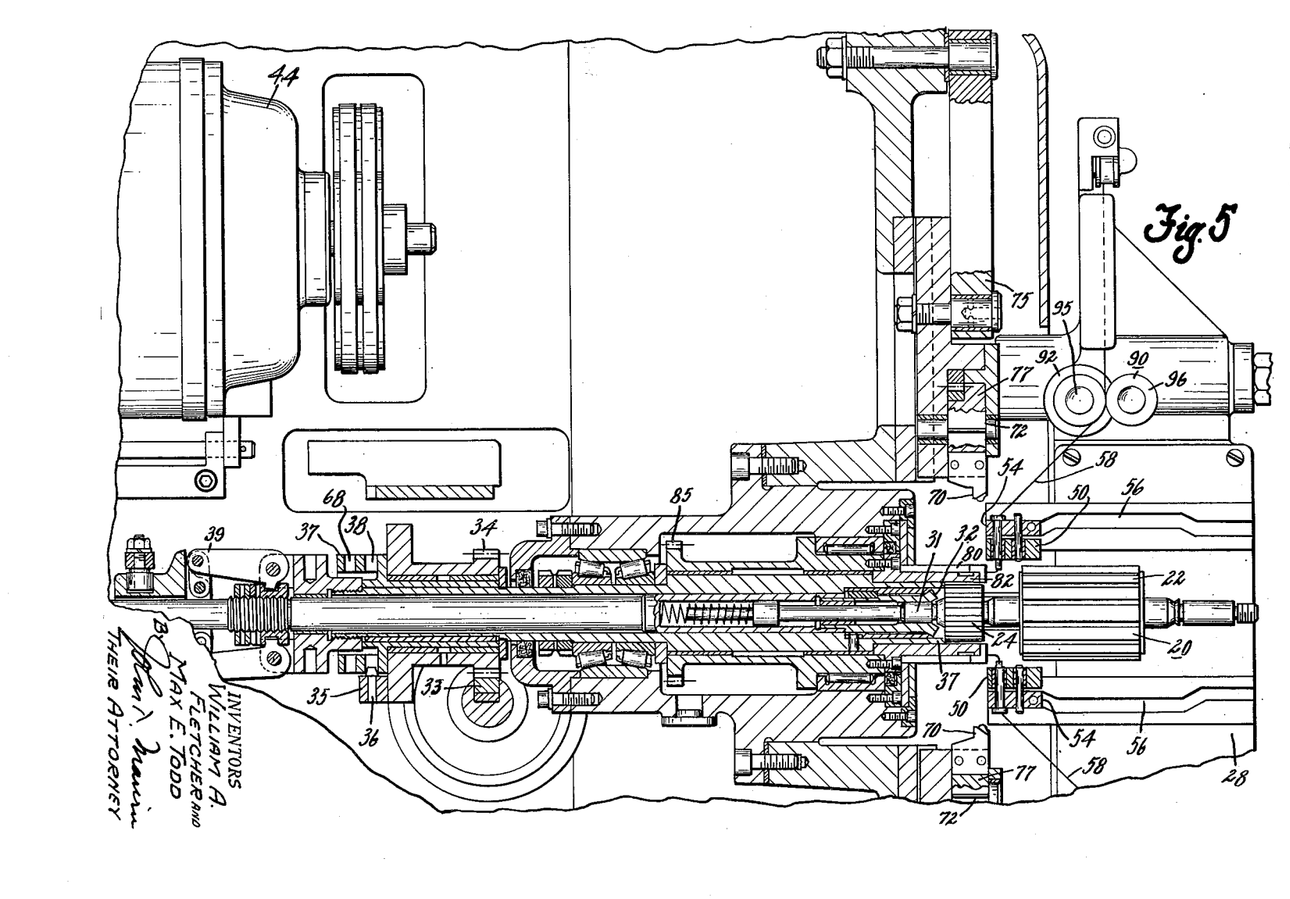
FIGURE 5 is a broken away view partly in section showing a collet for grasping the armature, and the means for rotating the armature during the winding operation.
Figure 6:
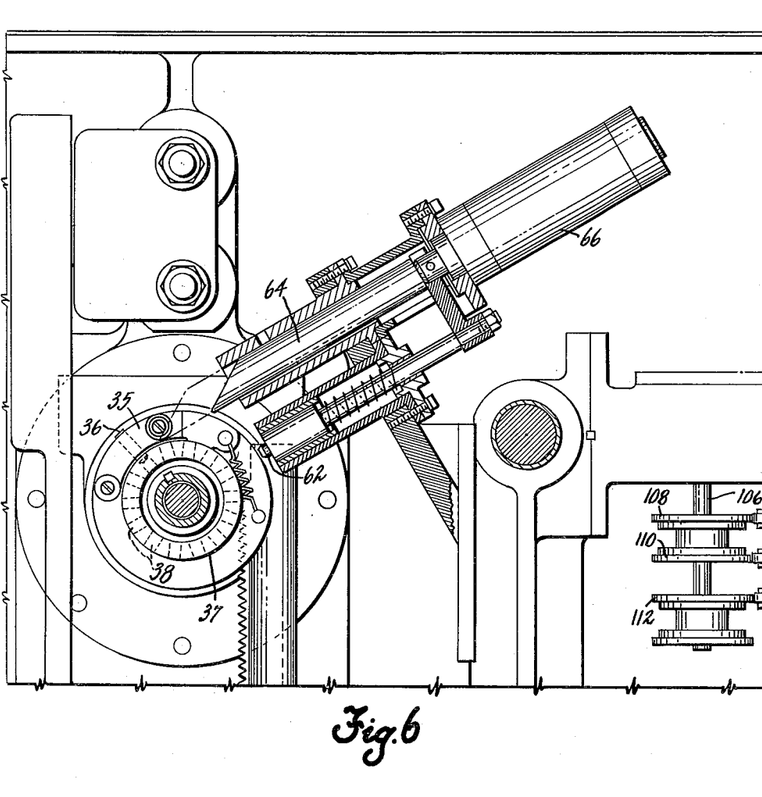
FIGURE 6 is a broken away view partly in section showing the means for indexing the machine for changing the position of the armature relative to the wire guides as shown in FIGURE 1.

Member 37, see FIGURE 1, is oscillated over a predetermined range of movement by rack 33 and gear 34. A movable pawl 35, pivoted on gear 34, see FIGURES 1 and 6, has a pin 36 which normally is received in one of the circumferentially spaced holes 38 in member 37 so as to couple and drive member 37 through the gear 34 so that the serrated end of member 37 is rotated. This is clearly seen as indicated in FIGURE 5 wherein the armature 20 is positioned against the serrated end of member 37 which is coupled for rotation with the gear 34 by a pin 36 which fits into one of the holes 38 so that member 37 is rotated by rack 33 which is driven in the properly timed relation with the various other parts of the apparatus as in FIGURE 1 by means of cam wheels 40 and 42 and by electric motor 44 which transmits its rotation through clutch 46.

Figure 3:
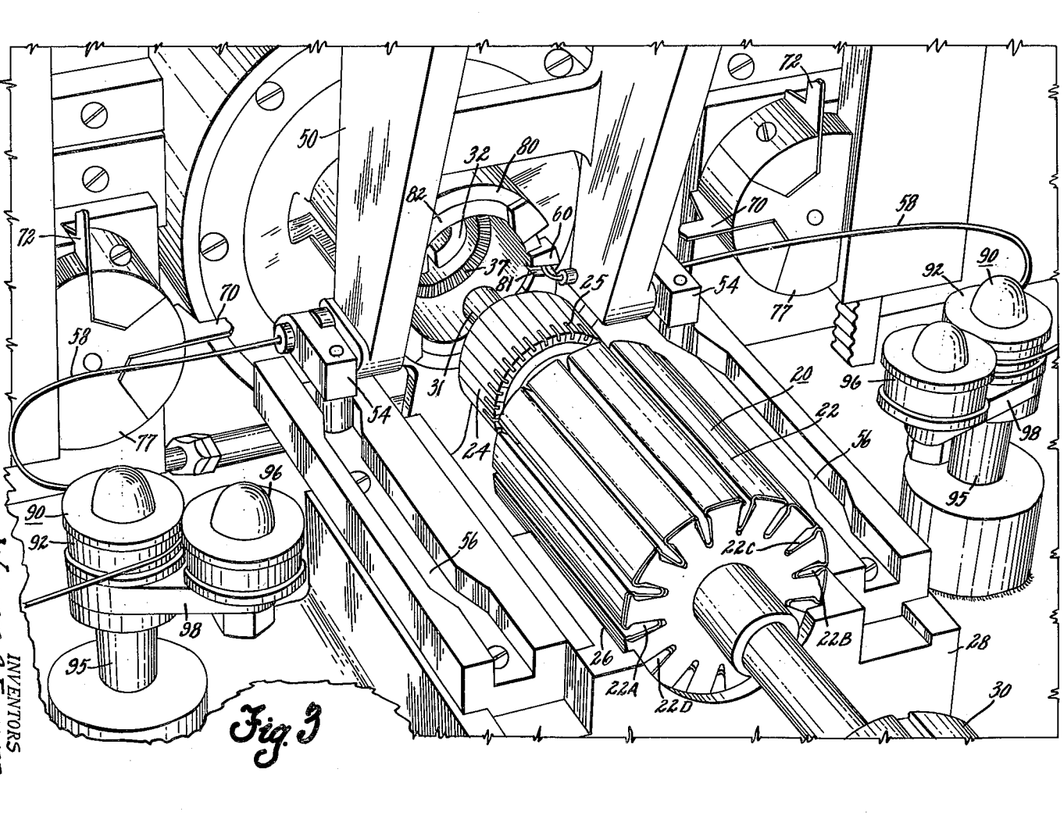
FIGURE 3 shows an unwound armature prior to the positioning thereof in the armature winding machine.
Figure 13:
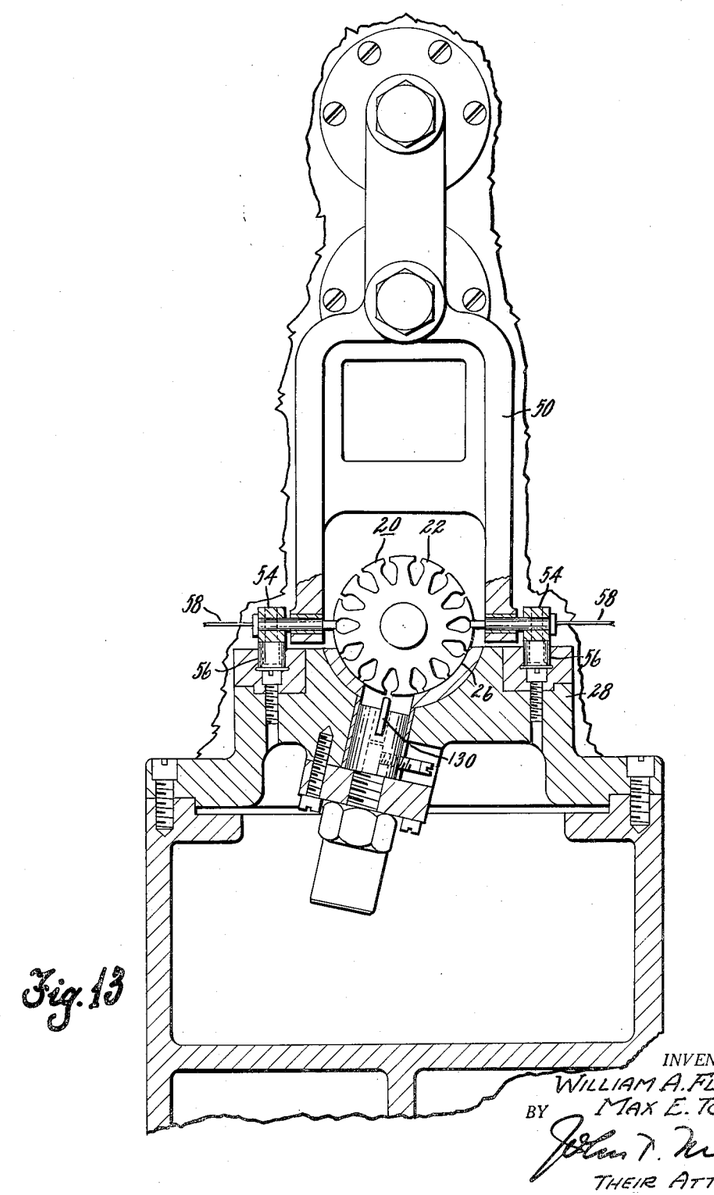
FIGURE 13 partly in section shows the location of the locating pin for indexing the armature when the armature is placed in the machine.

The wishbone shaped wire guide carrier 50, see FIGURES 1, 3, and 13, is moved in timed sequence with the oscillatory rotation of member 37 by suitable levers and cam 52, so that a pair of wire guides 54, secured to the arms of wishbone 50, are moved longitudinally along the outer surface of armature 20. These wire guides 54 are guided by slots 56 in nest block 28 so that the point of delivery of wire 58 from the guide 54 is caused to substantially follow the outer contours of the armature 20. Slots 56 are shaped and located relative to core 22 so the guides 54 will cause the wire 58 to be axially aligned with the core 22 slots when the wishbone member 50 has caused the guides 54 to be moved to either end of the armature core 22 so that when rack 33 rotates member 37 to correspondingly rotate the armature 20, the wire will be directed from slot 22A to slot 22C, see FIGURE 3, and simultaneously the wire, as applied in slot 22B, will be directed to the slot 22D. This result is duplicated on the commutator 24 end of the core 22 during the winding cycle of the machine and the number of turns applied to form the coil will depend upon the specifications of the armature as set forth in wiring diagram in FIGURE 4 of the drawings which in turn will dictate the shape of the various cams of the apparatus as is apparent to those skilled in the art.

Cams 40, 42 and 52 are suitably shaped relative to their cam followers so that after the armature 20 is positioned in the machine, as previously indicated, the wire 58 which has its end wrapped around horn 60, as will be hereinafter described, will be moved by guides 54 and deposited within slot 22A until the wishbone 50 has moved the guides 54 beyond the end of the armature core 22. At this point the movement of wishbone 50 temporarily ceases and the rack 32 rotates member 37 and armature 20 so that the slot indicated as 22A is moved to occupy the position formerly occupied by slot 22C so that the wire is looped over the rear end of the armature core 22. At this point the rotation of the armature by member 37 is halted while wishbone 50 moves the guides 54 forwardly so that the wire is deposited in the slot which was formerly 22C and is now in the position formerly occupied by slot 22A. This depositing of the wire in the slots and the looping thereof about the respective ends of armature core 22 may be accomplished any number of times as desired as shown in FIGURE 4A wherein four looped coils are wound on each side of the armature. At the conclusion of the winding of the coils, the wishbone 50 is caused to move opposite the horns 60 wherein the inserting and staking operation, to be hereinafter described, is accomplished.

From the above it is manifest that after the machine has wound the wire 58 to form coils which have the desired number of turns in slots 22A and has staked the ends thereof, into the slots 25, see FIGURE 3, in commutator 24, the machine must be indexed so that an empty slot is presented to the wire guides so that another coil of wire may be wound. The indexing is accomplished by means of pin 62 and plunger 64, shown in FIGURES 1 and 6, which are actuated by a piston in a fluid cylinder 66. The cylinder 66 causes pin 62 and plunger 64 to simultaneously move. Plunger 64 will move pawl 35 and cause pin 36 to be withdrawn from a hole 38 while pin 62 enters one of the holes 68 in a collar on member 37 so that gear 34 is free to rotate on member 37 while the member 37 is held in position by means of pin 62. At this point cam 42, which has one-half the rotational speed of cam 40 causes rack 33 to move gear 34 a predetermined distance about member 37. Cylinder 66 then is actuated to cause plunger 64 and pin 62 to be withdrawn, and pawl 35 permits pin 36 to be re-engaged in one of the holes 38. Rack 33 is then moved by cam 42 to its normal position to complete the indexing of member 37 and a fresh slot on the armature 20 will be presented to the wire guides 54 when they are moved by the wishbone 50.

Figure 4:
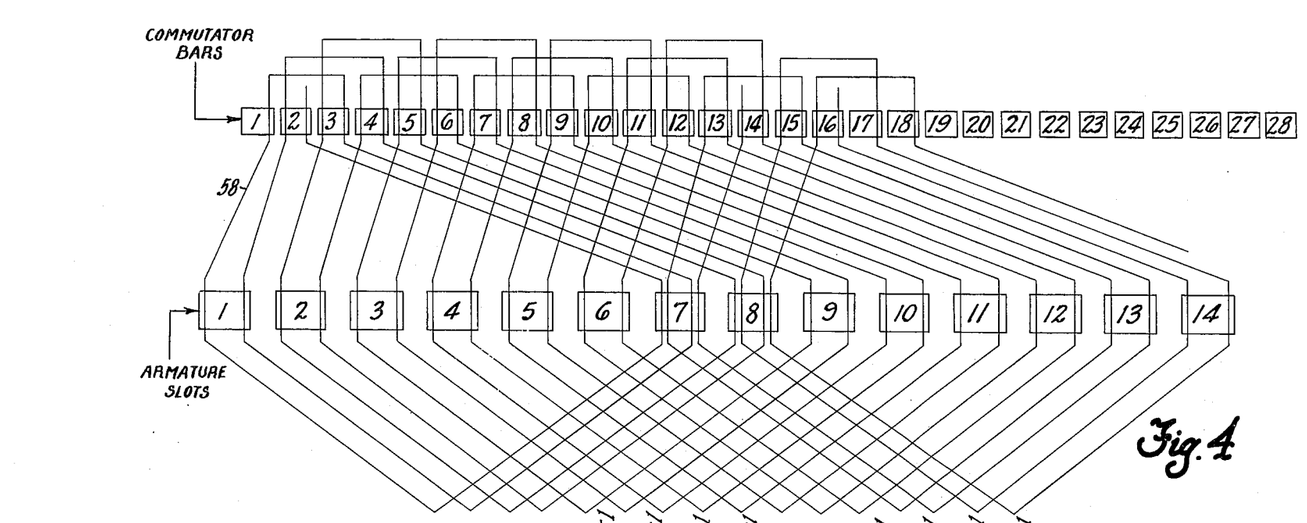
FIGURE 4 shows one form of a wiring diagram of an armature which may be wound in the armature winding machine according to the present invention.
Figure 4A:
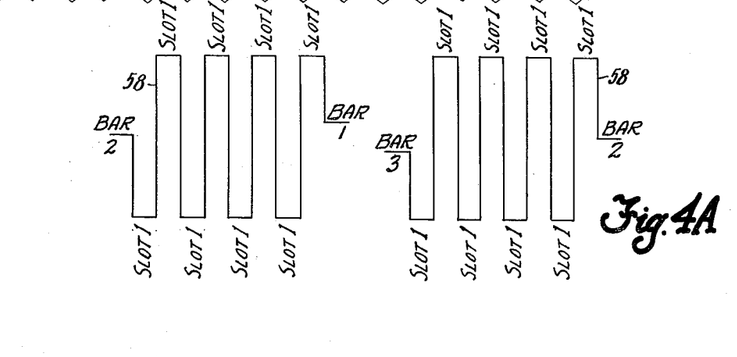
FIGURE 4A diagrammatically shows the sequence of winding and staking of two coils.
Figure 7:
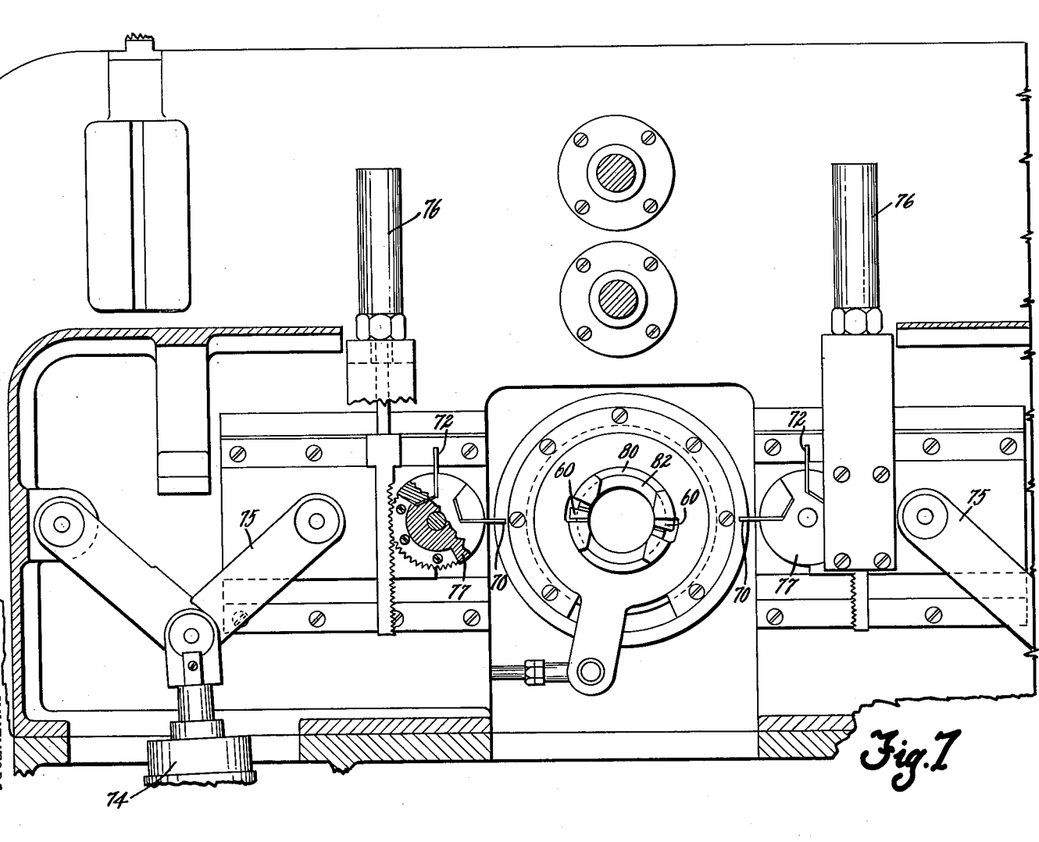
FIGURE 7 partly in section shows the location of the staking punches in a normal position.
Figures 11, 11A:
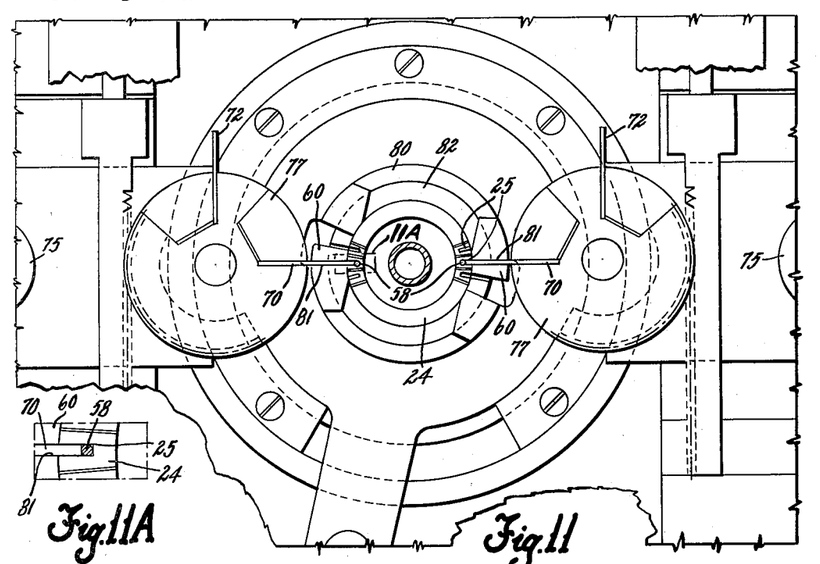
FIGURES 11 and 11A are broken-away views showing the punches as inserting the wires in the bottom of the commutator slots.
Figures 12, 12A:
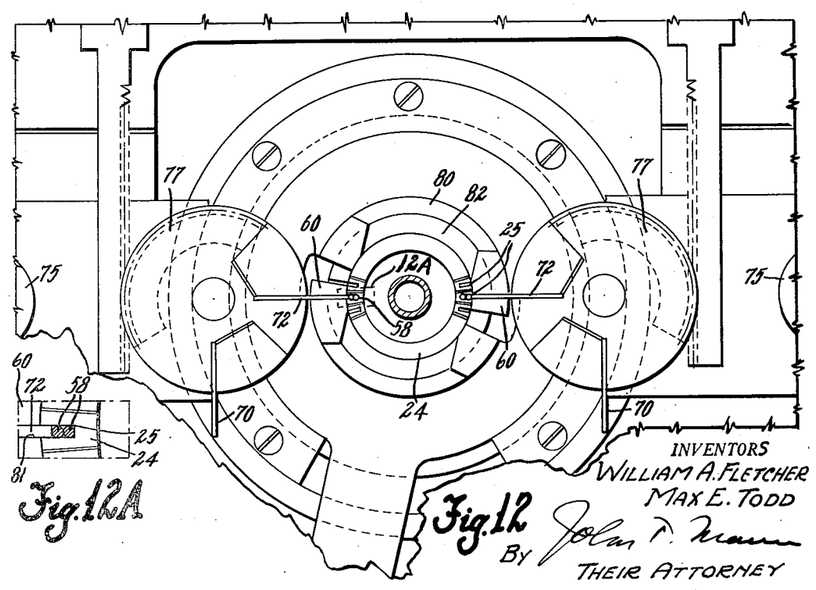
FIGURES 12 and 12A are views similar to FIGURE 11 wherein shorter punches stake the wires in the top of the commutator slots.

From the wiring diagram as shown in FIGURE 4, it is apparent that two wire ends are received in each of the slots 25 of commutator 24. To accomplish this objective longer 70 and shorter 72 staking and cutting punches are provided, as shown in FIGURES 1 and 7, which move horizontally to perform the staking operation. This horizontal movement is accomplished through the operation of the fluid cylinders 74 and levers 75. The longer of the staking punches 70 is normally presented for the staking operation wherein the wire is inserted into the bottom of a slot 25 in a bar of commutator 24 as shown in FIGURE 11 of the drawings. When, however, the end of a second wire is to be placed on top of the first wire in one of the slots 25, fluid cylinder 76 through a suitable rack and pinion causes the rotation of punch holders 77 so that the punch 72 is in the position as shown in FIGURE 12 for accomplishing the staking operation shown in FIGURE 14.

So the staking operation may be successfully accomplished it is manifest that the end of each coil of wire to be inserted and staked must be held in proper position relative to the slot 25, before the proper staking punch 70 or 72 is brought into operation.

Figure 8:
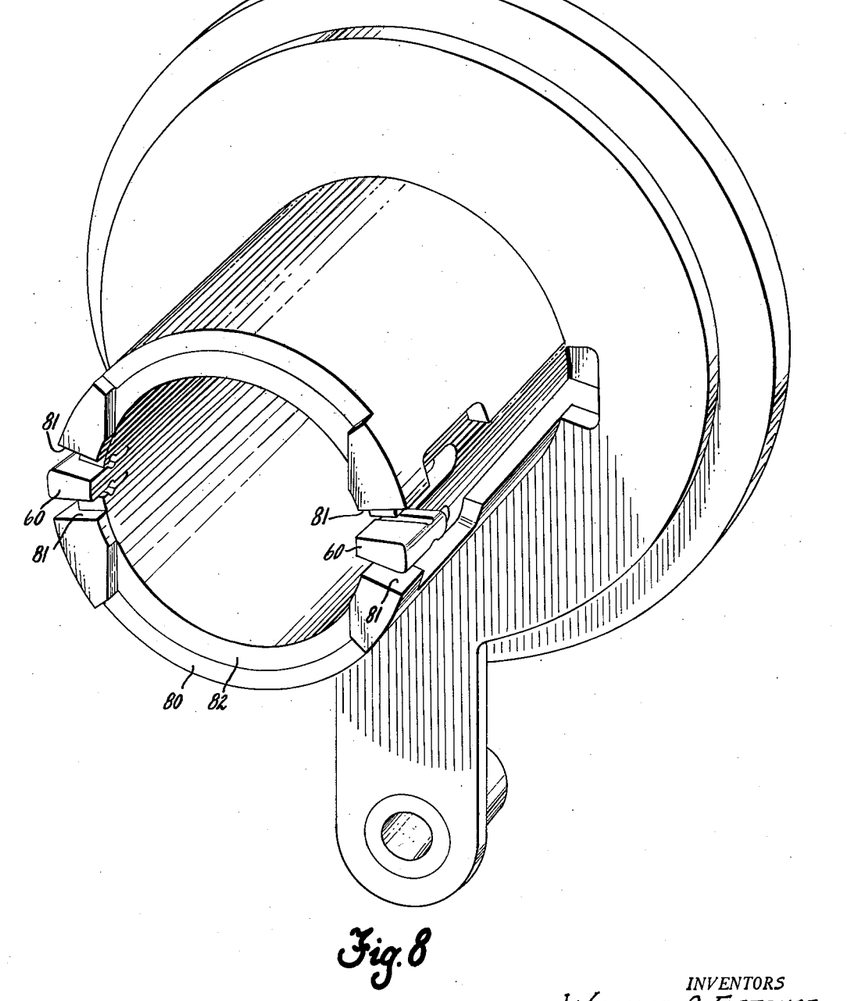
FIGURE 8 is a perspective view of the wire holding the wire pinching means which hold the wire during the staking operation.
Figure 9:
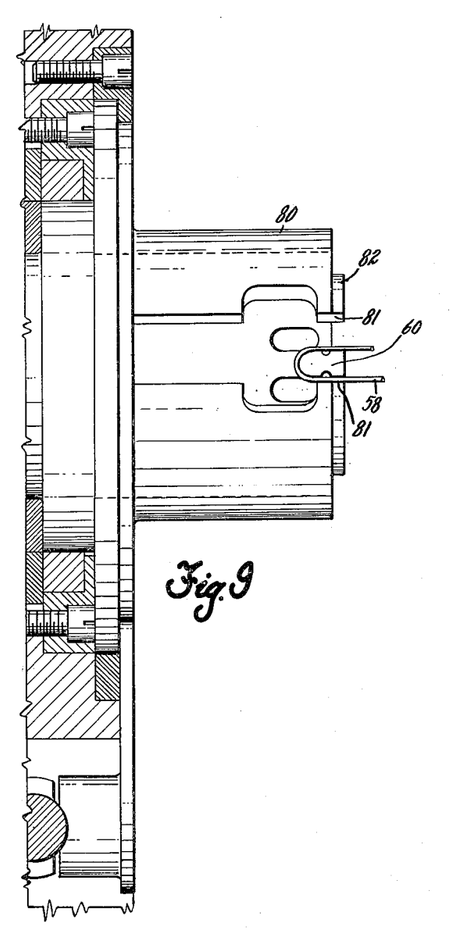
FIGURE 9 shows a wire as looped over a horn in the wire holding means and as pinched in position by the wire pinching means as in FIGURE 8.
Figure 14:
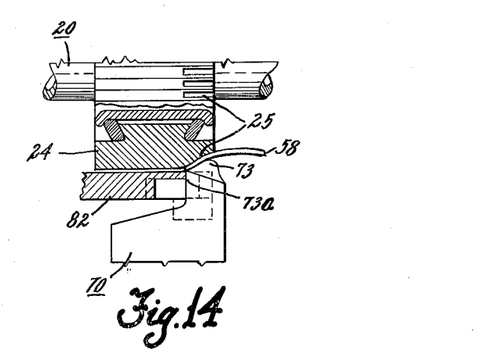
FIGURE 14 partly in section shows the shearing and punching operation when the wire is inserted into the commutator slot.

This is accomplished by a wire pinching member 80 and a wire holding member 82. The disposition of these members is most clearly seen in FIGURE 8 wherein member 82 is rotatably journalled within member 80. Previously mentioned wire horns 60 are integrally formed on member 82 and extend within an opening in member 80 so that the wire guides 54 will loop the ends of the wire over the horns 60 as the guides 54 are moved forwardly to the furthest point of their travel and guides 54 are caused to dwell for a moment while member 82 is rotated a few degrees so as to bring the other side of the horn 60 into alignment with the wire guide 54 so that as wishbone 50 causes the wire guide 54 to retreat from its farthest forward position, the wire will be looped over the horn 60. Member 80 then rotates a few degrees in a proper direction, for example, clockwise in FIGURES 9, 11 and 12. This rotation of member 80 relative to horn 60 causes the wire to be lightly pinched between the lug surfaces 81 on member 80 and the horn 60 to hold the wire in place while one of the punches 70 or 72 is horizontally moved toward the commutator 24, to cause a portion of the wire to pass from between the surface 81 and horn 60 into slot 25 of commutator 24 as seen in FIGURE 14. Further, as the wire is simultaneously pressed into position in the slot 25 by portion 73 of punches 70 or 72 the wire end is severed from the portion looped about the horn 60 by the knife-like portion 73a of the punches which pass in close proximity to a cutting edge portion of member 82 so as to cause a wire to be sheared at this point and thereby accomplish the simultaneous staking and shearing operation.

The movement of members 82 and 80, shown diagrammatically in FIGURE 1, is accomplished in a timed sequence with the other operations of the machine by means of cams 84 and 86 which are carried by a common shaft 122 that is driven through suitable gears by motor 44. Cam 84 is located and shaped to move the member 80 while member 82 is driven through a suitable rack and pinion 85, as seen in FIGURES 1 and 5 of the drawings, to accomplish the looping of the wires over horn 60 and the pinching of wire 58.

It is apparent that after the staking and severing operation has been performed on wire 58 by punches 70 or 72, any appreciable tension on the wire will cause the wire to be withdrawn from its staked position as it is moved during the initiation of the winding operation by wire guides 54. To eliminate this difficulty, a wire tensioning device is provided which will impart slack to the wire. The slack forming means 90 are located between suitable sources of supply of wire, not shown, and wire guides 54 and comprises a roller 92 that is rotatably journalled on a shaft 95 and a roller 96 that is rotatably mounted on a movable support arm 98 which is also journalled on shaft 95. The movable support arm 98 is adapted to be actuated through a suitable rack and pinion 100 by a fluid cylinder 102 in a predetermined sequence of operation with the other portions of the apparatus. The wire 58 is passed between rollers 92 and 96 from which point it is delivered to wire guides 54. Before member 82 moves into pinching engagement with the wire 58, the fluid actuator 102 causes the roller 96 on the right of the drawing to be moved in a clockwise direction as seen in FIGURE 3 about a roller 92 so that a predetermined slack is imparted to the portion of wire 58 disposed between the rollers 92 and 96 and the guides 54. In this connection it is to be noted that duplicate rollers 96 on the left side of the apparatus is caused to rotate in a counterclockwise direction relative to roller 92 in FIGURE 3 so as to impart a predetermined slack to the wire on the other side of the apparatus. The slack imparted to the wire on both sides of the machine is sufficient to permit the wire guide 54 to move rearwardly to the end of the armature remote from the commutator before any appreciable tension is applied thereto through rollers 92 and 96, so that the wire will not be pulled from the slots 25 of armature 24 after it has been staked and cut by staking punches 70 and 72.

In the embodiment shown herein armature core 22 has 14 slots, the clutch 46 is permitted to rotate 14 revolutions for each armature 20 that is to be wound, see FIGURE 4. When the armature 20 is positioned in nest block 28, a locator pin 130 in the block 28, see FIGURE 13, is in a raised position and is received in one of the slots in armature core 22 and thereby indexes the armature 20 relative to the winding machine. The movement of the tail stock 30 into the chucking position closes various circuits in the machinery and causes the locator pin 130 to withdraw so that the sequence of winding and staking operations may take place in a timed sequence.

Figure 10:
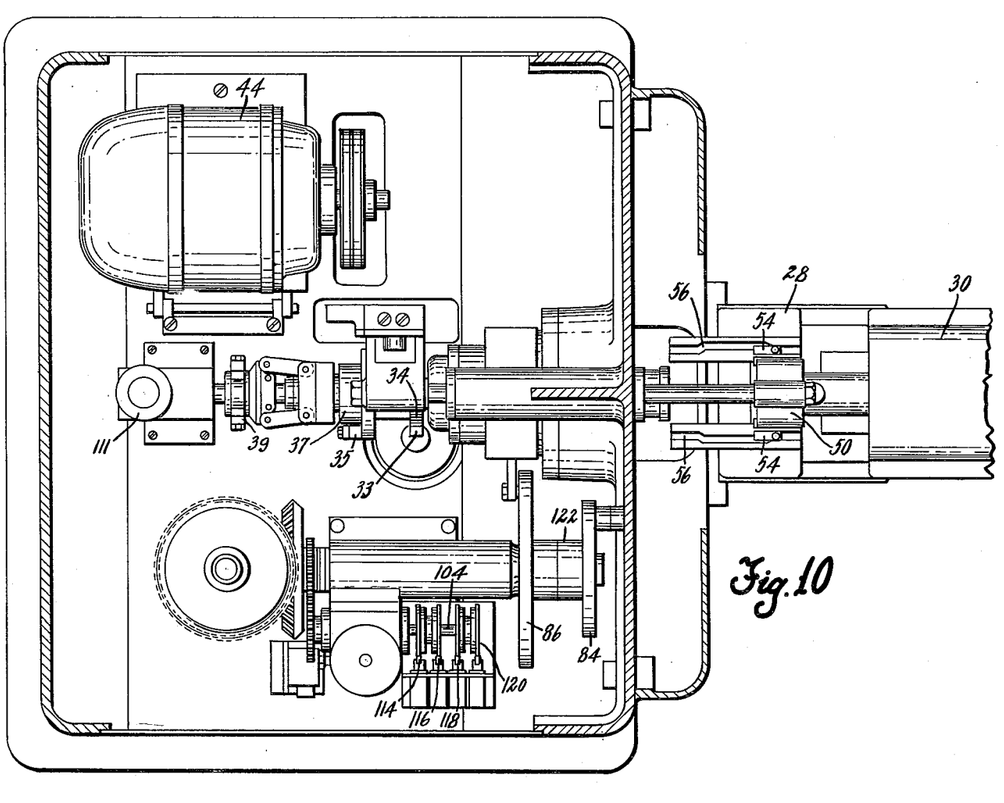
FIGURE 10 is a plan view partly in section showing the arrangement of various portions of the machine.

As seen in FIGURE 1, shafts 101, 103 and 104 each make one revolution for each revolution of clutch 46 or 14 revolutions per armature. Shaft 122 rotates cams 86 and 84 which operate the indexing of horns 60 and pinching member 80. This shaft 12 rotates 14 revolutions per each armature. The cams 84 and 86 each have a pair of lands to cause the members wherewith they are associated to move to the proper position for the pinching and cutting operation. Shaft 106, geared to make one revolution per armature, carries cams 108, 110 and 112, each of which operate through micro switches to actuate a fluid pressure cylinder. Cam 108 is connected with cylinders 76 and serves to position the staking punches 70 or 72 in the required position for inserting and staking the wires either into the inside or outside of the slots 25 in commutator 24. Cam 110 operates to move the locating pin 130 and to actuate cylinder 111 for chucking and unchucking armature 20 at the beginning and end of the winding operations. Cam 112 operates to engage the clutch 46 during the winding and staking cycle. Shaft 104 carries and rotates cams 114, 116, 118 and 120 which are operatively connected through suitable micro switches to various pressure cylinders, see FIGURE 10. Cam 114 is used to operate staking cylinder 74. Cam 116 operates the cylinder 102 which provides slack to the wire at the proper point of operation of wishbone 50. Cam 118 is used to energize cylinder 111 to properly eject the armature 20 after a complete coil has been wound and staked, and cam 120 is used to control the tension on the wire by an apparatus not shown.

*Operation of machine*

After an armature 20 is properly positioned in the machine wherein the wires 58 are properly threaded with the proper slack, the various control circuits will be energized and clutch 46 will be engaged and begin to rotate. At this point wire pinching member 80, and horn 60 as carried on member 82 will be energized through cams 84 and 86 respectively to hold the wire so that cylinder 74 may move punch 70 and thereby stake the end of the wire into the bottom of slot 2 of the commutator, see FIGURE 4. The rack 33 will then rotate the armature 20 through member 37 so that slot 7 is in proper position relative to guides 54 and simultaneously cam 52 will cause these guides to move rearwardly and deposit the wire in slot 7. When the cam 52 has caused guides 54 to move to the furthest rear position, the cam 52 will cause the guides 54 to dwell in that position for a movement while the rack 33 as actuated by cam 40 causes member 37 to rotate and present slot 1 to guides 54. Cam 52 will then move guides 54 forwardly along the armature core 22 to a point intermediate the core 22 and commutator 24 where the movement of the guides is again momentarily halted while rack 33 rotates member 37 so that slot 7 is again presented for winding and thereby complete one turn of a coil that is to be wound in slots 1 and 7. In the particular embodiment shown in FIGURE 4, four turns are formed on each coil. This result is accomplished by the configuration of cams 52 and 40.

After the completed coil is formed in slots 1 and 7, cam 52 causes the wire guides 54 to move to the most forward position where the wire is suitably pinched, inserted cut and staked by punch 70 into the bottom of bar 1 in commutator 24. The cam 42, which turns 7 revolutions for each armature 20 to be wound then indexes the commutator 24 so that bar 3 is presented for the inserting, cutting and staking operation by punch 70. It is to be appreciated that the various other mechanisms such as member 80, horn 60, and punch 70 heretofore described, all cooperate to produce this indexing of the commutator 24 by cam 42 and the staking operation by punch 70.

Figure 2:
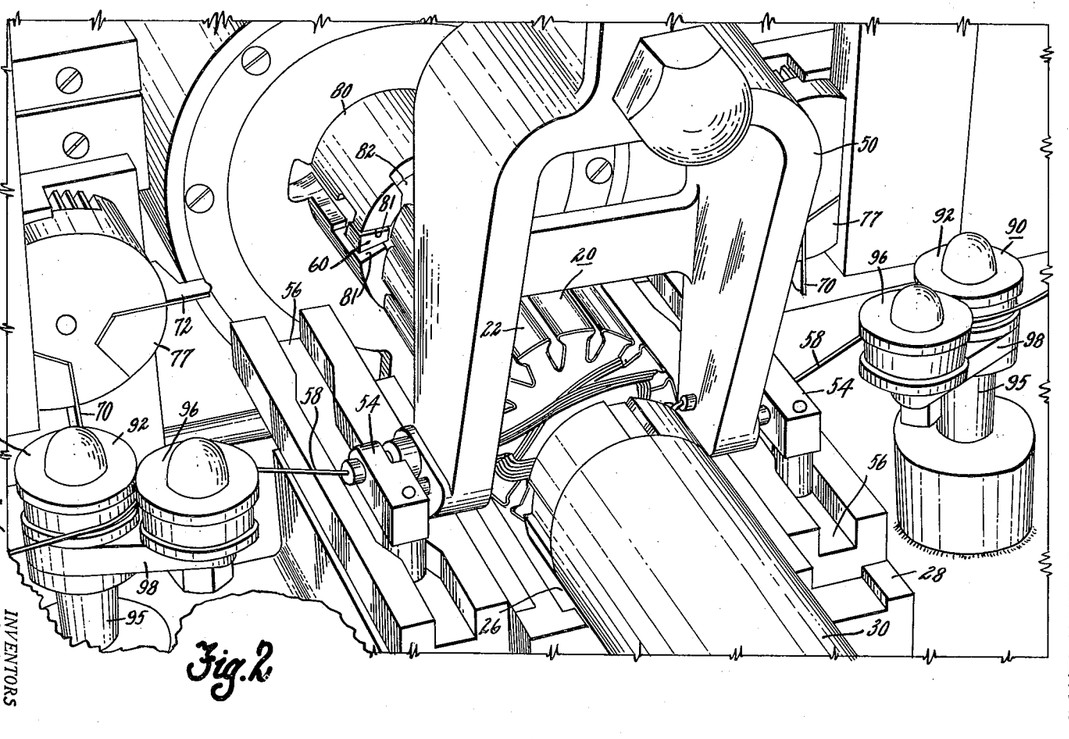
FIGURE 2, in perspective, shows a partially wound armature as positioned in the machine.

After the wire is staked in the bottom of bar 3 by punch 70 the slots 1 and 7 are presented so that a second coil may be wound on top of the first coil as heretofore described. After the second coil has been wound in slots 1 and 7 the commutator is indexed so that bar 2 is presented for the staking operation by punch 72 at the conclusion of which the commutator is indexed by the cam 42 so that bar 4 may be staked by punch 70. It is to be here noted that the first three staking operations are accomplished by punch 70 and thereafter cam 108 causes the staking punches 70 and 72 to alternate when the wires are staked in the inner and outer portions of the slots 25 in the commutator bars. After the second wire end has been staked in bar 4 of the commutator, cylinder 66 is actuated by cam 118 and rack 32 by cam 42 so that the member 37 is indexed and slots 8 and 2 are presented for winding and bars 3 and 5 are presented for staking as shown in FIGURE 2 by the method as outlined above.

Further, as clearly seen in the drawing, two coils of wire are simultaneously wound on each side of armature 20. Thus, while one of the wire guides 54 is positioning the wire in slot 7, the other is positioning a wire in slot 14 and while the guide 54 places the return portion of the wire in slot 7 in slot 1, the wire in slot 14 will be returned and deposited in slot 8. The terminal ends of these coils are both simultaneously pinched, inserted, cut and staked into the proper slots in the commutator bars by duplicate mechanisms that are located on each side of the machine which are activated in the proper sequence by mechanisms heretofore described.

From the above, it is manifest that while the machine disclosed may be utilized to wind but a single coil of wire at a time, the operation wherein two coils are wound upon opposite sides of the armature tends to provide an armature structure that is more perfectly dynamically balanced and will provide a machine and method whereby the armature may be wound in a shorter period of time. Further, the method and apparatus outlined will effect a considerable saving of copper wire over the methods heretofore employed as the only portion of the wire that is wasted, as the armature is wound, is that which is looped about the rounded portion of the horn 60. This saving of material along with the considerable saving of labor will provide a wound armature at a far less cost than with the methods and apparatuses heretofore employed.

As previously set forth, while the apparatus described may be used to align wire that is coated with any suitable insulation of material, the preferred embodiment as used with the method of the present invention includes the use of nylon as a covering for the wire. This material is highly resistant to abrasion and has good insulative qualities. The wire used may be of any suitable thickness providing the insulation is of sufficient thickness to prevent shorts between the wires and so that the wire will fit into the slots of the armature core. It is apparent that insulating coatings other than nylon may be employed providing the material will stand the rigorous treatment as received during the winding operation and will have a low melting point and a narrow range of temperature during the change from the solid to the vapor state and further does not contain an appreciable amount of organic materials such as fillers and dies. Nylon is highly suitable for the application involved as it is mobile about 480° F. and has a melting point of 487° F. and goes to the vapor state at a temperature of 560° to 570° F. Thus, solder which has a melting point of 450° F. and which is heated to a temperature higher than the mobility and vaporization temperatures of the nylon when brought into contact with the commutator and the staked ends of the wires will have its heat conducted through the severed ends of a wire and ruptured portions of the coating along the sides of the wire. This heat will be conducted by the copper of the wire to the insulation covering of the wire to cause the nylon to first melt and then quickly vaporize to present a clean metal surface which readily is solderable to the metallic portions of the commutator. In this connection it is to be noted that the rupture of the side surfaces of the nylon wire during the insertion of the wire into the commutator slot is important to the success of the present invention as it aids and concentrates in the heat from the solder to the metallic portion of the end of the wire which has been staked in the slot and hastens the melting and vaporization of the nylon coating in this immediate area only without being conducted to and melting the coating on the remainder of the winding. If the rupture of the insulation were not accomplished and localized by the punching operation, the subsequent soldering operation would be very difficult to accomplish as the heat transfer to the nylon would be delayed as the copper of the wire would not be in contact with a sufficient quantity of solder to successfully melt the covering at the point to be soldered without injury to the remainder of the nylon covering on the wire. The armatures as formed according to the present invention when wound with nylon requires no other insulation than that afforded by the nylon coating and when used have been found to operate at a lower temperature than the conventional type armatures heretofore used.

Further as the nylon presents a very tough and durable coating for the wire, it reduces shorts that occur in the conventionally wound armatures when the wires rub upon each other during the operation of the machine. It has been found that a very low rejection and/or failure of armatures according to the type herein disclosed occurs when the armatures are properly wound with the proper amount of tension on the wire during the winding operation so as to form the individual coils that are tightly wound within the slots of the armature to minimize the shifting of the wires when the armature is placed in service.

While the embodiment of the present invention as herein disclosed constitutes a preferred form, it is to be understood that other forms might be adopted.

What is claimed is as follows:

1. In a continuous method for winding an armature assembly having a commutator with notches therein and an armature, the steps comprising; staking the end of a coil winding into a commutator slot, applying a coil winding to said armature beginning with said end, forming a U-shaped loop in a length of wire so the U-shaped loop forms two lengths of wire that are joined by a curved portion having a relatively small radius of curvature, one of said lengths forming the end of said coil winding, aligning one of the lengths of wire of the U-shaped loop with a notch in the commutator, cutting said one length of wire from the curved portion and staking the cut end of the length of wire in the notch with which the length was aligned, rotating the commutator to align another notch with the other length of wire, of the U-shaped loop, cutting the other length of wire from the curved wire portion of the U-shaped loop, and staking the cut end of said other length in the other notch of the commutator so substantially the only material wasted during the staking of the two lengths of wire is the small curved portion of the wire which forms the loop.

2. In a method for winding an armature assembly with a wire wherein the armature assembly includes a shaft, a commutator having slots therein and a slotted armature core, the steps comprising; gripping a length of wire by gripping means, aligning said gripped wire with a commutator slot, forcefully driving said wire from said gripping means into said commutator slot to securely stake it therein, rotating said armature about the axis of the armature shaft to a predetermined angular position, holding the armature stationary, laying the wire in one of the armature slots by progressively feeding said wire in one direction axially along said core, rotating said armature less than 360° in one direction of rotation to a second position to lay the wire across one of the ends of said armature, progressively feeding said wire in a reverse direction and axially relative to said core for laying the wire in another armature core slot, rotating said armature less than 360° in the reverse direction to return said armature to said first position for laying the wire across the other end of said core and for forming a coil of said wire within said slots and about the ends of said core, repeating the cycle of winding movements as aforesaid until the desired number of turns of wire are formed on said coils, and then moving an end of said wire toward said commutator after said coil is formed, gripping said wire by gripping means, rotating said armature to another predetermined position so that the end of said wire may be staked into another commutator slot, and then severing said wire and immediately driving a severed length of said wire from said gripping means into said commutator slot to securely stake it therein.

3. In the method for winding an armature assembly as set forth in claim 2 wherein the ends of the first three wires are staked in the bottom of the slots in said commutator and thereafter alternate ends of wires are superimposed on the ends of wire previously staked in said slots and wherein the insulation surrounding the ends of each of the staked portions of said wires is ruptured during the staking thereof into the notch in said commutator, and further wherein the insulation is vaporized and the wire secured to the commutator following the staking by placing molten solder into contact with at least a portion of said commutator and wire, said solder having a temperature above the vaporization temperature of the insulation.

4. In a method for winding an armature assembly with a wire wherein the armature assembly includes a shaft, a commutator having slots therein and a slotted armature core, the steps comprising; staking the ends of two lengths of wire in oppositely disposed slots in the commutator, rotating said armature about the axis of the armature shaft to a predetermined angular position, holding the armature stationary while laying the wires in oppositely disposed slots in the armature core by progressively feeding said wire in one direction axially along said core, rotating said armature less than 360° in one direction of rotation about said axis to a second position to lay the wires across one of the ends of said armature, progressively feeding said wires in a reverse direction and axially relative to said core for laying the wires in other oppositely disposed armature core slots, rotating said armature less than 360° in the reverse direction about said axis to said first position for laying the wires across the other end of said core and for forming two coils of said wire within said slots and about the ends of said core, repeating the cycle of winding movements as aforesaid until the desired number of turns of wire are formed in each of said coils, and then moving the ends of each of said wires toward said commutator after said coils have been formed and rotating said armature about said axis to another predetermined position, severing said wires and immediataely staking the severed lengths of said wires into other oppositely disposed commutator slots by maintaining said length of wire in continuous motion during and after severing to thereby accomplish the staking as aforesaid, and then indexing said armature so that the above cycle of operations may be performed for completely winding an armature assembly.

5. In the method for winding an armature assembly as set forth in claim 4 wherein the ends of the first three pairs of wire are staked in the bottom of the slots in said commutator and thereafter alternate ends of wires are superimposed on the ends of wire previously staked in said slots and wherein the insulation surrounding the ends of each of the staked portions of said wires is ruptured during the staking thereof into the notch in said commutator, and further wherein the insulation is vaporized and the wire secured to the commutator following the staking by placing molten solder into contact with at least a portion of said commutator and wire, said solder having a temperature above the vaporization temperature of the insulation.

6. In a method for winding an armature assembly with a wire coated within an insulating material and wherein the armature assembly includes a shaft, a commutator having slots therein and a slotted armature core, the steps comprising; gripping a length of wire by gripping means, driving an end of a length of wire from said gripping means into a slot in the commutator while simultaneously rupturing a portion of the insulation surrounding said end as it is moving into said slot, rotating said armature about the axis of the armature shaft to a predetermined angular position and laying the wire in one of the armature slots by progressively feeding said wire in one direction axially along said core while said armature remains stationary, rotating said armature less than 360° in one direction of rotation and about said axis to a second position to lay the wire across one of the ends of said armature, progressively feeding said wire in a reverse direction and axially relative to said core for laying the wire in another armature core slot, rotating said armature less than 360° in a direction reversed from said one direction to said first position for laying the wire across the other end of said core and for forming a coil of said wire within said slots and about the ends of said core, repeating the cycle of movements as aforesaid until the desired number of turns of wire are formed into coils on said armature core, and then moving an end of said wire toward said commutator after said coil is formed and rotating said armature about said axis to another predetermined position, severing said wire and immediately staking a severed length of said wire into another commutator slot by maintaining said length of wire in continuous motion during and after severing to thereby accomplish the aforesaid staking, rupturing said insulated covering as said length of wire is moving into said slot, holding said severed end of said wire and indexing said armature so that the above cycle of operations may be performed for completely winding an armature assembly.

7. In a continuous method of winding an armature assembly including a slotted armature and a slotted commutator fitted to a shaft, the steps comprising; supporting said armature assembly for rotational movement around its longitudinal axis while preventing substantial axial movement of said assembly, gripping a length of wire that is to be applied to said armature by gripping means with said wire in alignment with a first commutator slot, forcefully severing said wire and immediately driving said wire out of said gripping means by staking means into said first commutator slot, maintaining said wire in continuous motion during the severing and insertion of the wire into the slot by said staking means, applying a coil winding of said wire of at least one turn to circumferentially spaced slots of said armature while maintaining the armature from axial movement, gripping a length of wire extending from said armature and forming the end of a coil winding with said gripping means, aligning a second commutator slot with the wire gripped by said gripping means, forcefully severing said wire and immediately driving said wire out of said gripping means by staking means into said second commutator slot, maintaining said wire in continuous motion during the severing and insertion of the wire into the slot by said staking means, and then repeating said steps as aforesaid to apply a plurality of coil windings to said armature with ends staked to said commutator.

8. In a continuous method of winding an armature assembly including a slotted armature and a slotted commutator fitted to a shaft, the steps comprising; gripping a length of wire that is to be applied to said armature as one end of a coil winding by gripping means with said wire in alignment with a first commutator slot, forcefully severing said wire and immediately driving said wire out of said gripping means by staking means into said first commutator slot, mantaining said wire in continuous motion during the severing and insertion into the slot by said staking means as aforesaid, applying a coil winding of said wire of at least one turn to circumferentially spaced slots of said armature beginning said coil winding with the lead initially staked into said first commutator slot, gripping a length of wire extending from said armature and forming the end of a coil winding with said gripping means, aligning a second commutator slot with the wire gripped by said gripping means, forcefully severing said wire and immediately driving said wire out of said gripping means by staking means into said second commutator slot, maintaining said wire in continuous motion during the severing and insertion into the slot by said staking means as aforesaid, and then repeating said steps as aforesaid to apply a plurality of coil windings to said armature with ends staked to said commutator.

9. In a method of securing a short length of insulated wire in a notch in a commutator, the steps comprising: inserting the short length of wire into the notch and rupturing the insulation on the short length of wire as it is in motion and being inserted into the notch, and then vaporizing the insulation on the wire over the ruptured length by bringing molten solder into contact with at least a portion of said commutator and length of wire, the solder being of sufficient temperature to vaporize the insulation.

10. In a method of securing a short length of insulated wire in a notch in a commutator, the steps comprising: forcefully inserting the short length of wire into the notch and rupturing portions of the insulation along said short length as it is forcefully inserted into the notch, and then vaporizing the insulation along the short length of wire by bringing molten solder having a temperature above the vaporization temperature of the insulation into contact with at least a portion of said commutator and said short length of wire.

11. In a method of securing a short length of a coated wire in a notch in a commutator, the steps comprising: severing said short length of wire from a longer length of wire and maintaining said short length of wire in continuous motion, during and after severing, to thereby forcefully insert it into a commutator notch, rupturing the insulation on said wire along said length as it is being forcefully inserted into said notch to provide a wire positioned in the notch having a bared end and a ruptured coating along said short length, and then vaporizing the ruptured coating and forming a solder bond between the wire and commutator by bringing molten solder into contact with at least a portion of said commutator and said short length of wire, said solder having a temperature above the vaporization temperature of the coating.

References Cited in the file of this patent

UNITED STATES PATENTS

| | | |
|---|---|---|
| 1,662,881 | Chapman | Mar. 20, 1928 |
| 1,979,454 | Cullin | Nov. 6, 1934 |
| 1,986,373 | Shippy et al. | Jan. 1, 1935 |
| 2,003,169 | Baldwin | May 28, 1935 |
| 2,056,534 | Poole | Oct. 6, 1936 |
| 2,074,366 | Collins et al. | Mar. 23, 1937 |
| 2,284,373 | Cullin | May 26, 1942 |
| 2,315,300 | Vaillant | Mar. 30, 1943 |
| 2,329,409 | Mironowicz | Sept. 14, 1943 |
| 2,381,750 | Hunsdorf | Aug. 7, 1945 |
| 2,385,619 | Fausset | Sept. 25, 1945 |
| 2,568,945 | Burdulis | Sept. 25, 1951 |
| 2,620,139 | Swift | Dec. 2, 1952 |
| 2,632,124 | Hole | Mar. 17, 1953 |
| 2,648,792 | Wylie | Aug. 11, 1953 |
| 2,657,458 | Pessel | Nov. 3, 1953 |
| 2,739,371 | Grisdale et al. | Mar. 27, 1956 |
| 2,743,508 | Isaacson | May 1, 1956 |
| 2,779,886 | Hunsdorf | Jan. 29, 1957 |

OTHER REFERENCES

Electrical Manufacturing, vol. 39, No. 6, pp. 111–114, 196, June 1947.